US012800350B2

(12) United States Patent
Rendon Hernandez et al.

(10) Patent No.: US 12,800,350 B2
(45) Date of Patent: Nov. 17, 2026

(54) CONTACT-LESS LINEAR DISPLACEMENT MEASUREMENT PCB SYSTEM FOR ELECTRICAL PROTECTIVE DEVICES

(71) Applicant: Schneider Electric USA, Inc., Boston, MA (US)

(72) Inventors: Adrian Abdala Rendon Hernandez, Tiffin, IA (US); Juan Ignacio Melecio Ramirez, North Liberty, IA (US); Collin Richard Fischels, Independence, IA (US); Alexander Salvador Alvarado, Iowa City, IA (US)

(73) Assignee: SCHNEIDER ELECTRIC USA, INC., Boston, MA (US)

( * ) Notice: Subject to any disclaimer, the term of this patent is extended or adjusted under 35 U.S.C. 154(b) by 195 days.

(21) Appl. No.: 18/806,156

(22) Filed: Aug. 15, 2024

(65) Prior Publication Data

US 2026/0049848 A1 Feb. 19, 2026

(51) Int. Cl.
*G01D 5/20* (2006.01)
*H02H 3/05* (2006.01)

(52) U.S. Cl.
CPC ............. *G01D 5/2053* (2013.01); *H02H 3/05* (2013.01)

(58) Field of Classification Search
CPC .......... G01D 5/20; G01D 5/2053; H02H 3/05; H02H 1/00; H02H 1/0007; G01B 7/30
See application file for complete search history.

(56) References Cited

U.S. PATENT DOCUMENTS

2021/0063206 A1 3/2021 Ausserlechner
2022/0011085 A1 1/2022 Pichler et al.
2022/0282998 A1 9/2022 Novac et al.
2023/0408297 A1 12/2023 Qama et al.
2025/0354833 A1* 11/2025 Rendon Hernandez .................... G01D 5/20

FOREIGN PATENT DOCUMENTS

EP 3479072 B1 6/2020
EP 4124833 A1 2/2023
EP 4361571 A1 5/2024

OTHER PUBLICATIONS

Gao et al, A contactless planar inductive sensor for absolute angular displacement measurement, IEEE Acess, 2021, 10 pages.

* cited by examiner

*Primary Examiner* — Son T Le
(74) *Attorney, Agent, or Firm* — Stinson LLP

(57) ABSTRACT

An inductive sensor is integrated on a printed circuit board assembly (PCBA) of an electrical protective device, such that the inductive sensor is configured to contactlessly measure linear motion of an electrically conductive target mounted on the PCBA corresponding to a component of the electrical protective device. The inductive sensor comprises an integrated circuit, a transmitter coil, and receiver coils spaced apart vertically from the electrically conductive target. The integrated circuit is electrically coupled to the transmitter coil such that the integrated circuit is configured to transmit a high frequency time varying signal into the transmitter coil. The high frequency time varying signal energizes the transmitter coil thereby inducing a magnetic field. The magnetic field induces one or more output signals on the receiver coils and eddy currents in the electrically conductive target. The eddy currents produce a counter magnetic field that alters the output signals responsive to linear displacement of the electrically conductive target.

20 Claims, 12 Drawing Sheets

CONTACT-LESS LINEAR DISPLACEMENT MEASUREMENT PCB SYSTEM FOR ELECTRICAL PROTECTIVE DEVICES

FIELD

The present disclosure generally relates to inductive sensors for measuring linear motion of components of electrical protective devices.

BACKGROUND

Control sensors such as position, temperature, and even speed sensors are an essential part of industrial automation, as they permit automated and connected industrial systems to make decisions, and control industrial environments. Optical control sensors typically provide suboptimal results as they generally comprise delicate designs that are not suitable for use in an industrial environment. For example, optical control sensors subjected to dust, moisture, water, lubricant, and strong vibrations are usually at least one of inoperable and provide inaccurate results. One common type of sensor used to monitor parameters of industrial automation devices is a capacitive sensor. Particularly, there are planar capacitive sensors that utilize two printed circuit boards (PCBs) to fabricate stator and rotor electrodes. However, similar to optical sensors, the outputs of capacitive sensors are still sensitive to foreign matters such as moisture, water, and lubricant. Another common type of sensor used with industrial automation devices includes a mechanical sensor (e.g., a mechanical switch). However, the information provided by current mechanical sensors is limited. For example, current mechanical sensors are limited to providing discrete outputs (e.g., on or off) regarding a specific position of a target such as a switch.

SUMMARY

Aspects of the present disclosure provide an improved inductive sensor configured for measuring linear motion of an electrical protective device.

In one aspect, an inductive sensor is configured for measuring linear motion of an electrically conductive target mounted on a printed circuit board assembly (PCBA) for an electrical protective device. The inductive sensor comprises a transmitter coil on a sensor portion of the PCBA. The transmitter coil is configured for producing a magnetic field when energized. A plurality of receiver coils are on the sensor portion of the PCBA. The receiver coils are each electrically coupled to the transmitter coil via the magnetic field produced by the transmitter coil when energized. An integrated circuit on the PCBA is electrically connected to the transmitter coil. The integrated circuit is configured to transmit a high frequency time varying signal for energizing the transmitter coil to produce the magnetic field on the sensor portion. The magnetic field induces one or more output signals on each of the receiver coils. The magnetic field induces eddy currents in the electrically conductive target. The eddy currents produce a counter magnetic field configured to alter the one or more output signals of the receiver coils responsive to linear displacement of the electrically conductive target.

In another aspect, an electrical protective device for an industrial automation system comprises a printed circuit board assembly (PCBA) comprising a sensor portion and a target portion spaced apart vertically along a vertical axis of the PCBA at a predetermined spacing gap. An electrically conductive target is mounted on the target portion of the PCBA. An inductive sensor is on the sensor portion of the PCBA. The inductive sensor is configured to produce a magnetic field on the sensor portion. The magnetic field induces one or more output signals of the inductive sensor. The magnetic field induces a plurality of eddy currents in the electrically conductive target. The eddy currents produce a counter magnetic field configured to alter the one or more output signals of the inductive sensor responsive to linear displacement of the electrically conductive target.

In another aspect, a redundant inductive sensor system is configured for measuring linear motion of an electrically conductive target mounted on a printed circuit board assembly (PCBA) for an electrical protective device. The redundant inductive sensor system comprises a plurality of inductive sensors. Each of the inductive sensors are on one of a plurality of sensor portions of the PCBA. The plurality of inductive sensors each comprise a transmitter coil configured for producing a magnetic field when energized. Each of the inductive sensors comprises a plurality of receiver coils connected to the respective transmitter coil of each of the inductive sensors via the magnetic field produced by each respective transmitter coil when energized. A plurality of integrated circuits are on one or more of the sensor portions of the PCBA. Each of the integrated circuits are electrically connected to at least one of the transmitter coils of the inductive sensors. The integrated circuits are configured to transmit a high frequency time varying signal for energizing each of the transmitter coils to produce the magnetic fields on the sensor portions. The magnetic fields each induce one or more output signals on the respective receiver coils of each of the inductive sensors. Each magnetic field induces eddy currents in the electrically conductive target. The eddy currents produce a counter magnetic field configured to alter the one or more output signals of at least one inductive sensor responsive to linear displacement of the electrically conductive target.

In another aspect, a method for measuring linear motion of an electrically conductive target mounted on a printed circuit board assembly (PCBA) for an electrical protective device comprises transmitting, by an integrated circuit on the PCBA, a high frequency time varying signal for energizing a transmitter coil on a sensor portion of the PCBA such that the transmitter coil produces a magnetic field. One or more output signals on receiver coils are induced by the magnetic field on the sensor portion of the PCBA. The magnetic field induces eddy currents in the electrically conductive target. The eddy currents produce a counter magnetic field to alter the one or more output signals of the receiver coils responsive to linear displacement of the electrically conductive target.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

The present disclosure provides an inductive sensor configured for contactless, real-time linear motion sensing of a component of an industrial automation device, particularly an electrical protective device. The inductive sensor of the present disclosure provides increased robustness against harsh environmental conditions within industrial settings. Moreover, outputs from the inductive sensor provide insight regarding state and component health of a component of the electrical protective device, thereby enabling informative monitoring of the assets. Accordingly, such insight may also be used to predict factors such as state and component health of other components of the electrical protective device as well as an overall health of the electrical protective device itself. As will be described in greater detail below, systems and methods in accordance with the present disclosure provide a highly accurate and environmentally robust solution for measuring linear motion of a component of an electrical protective device.

Figure 1:
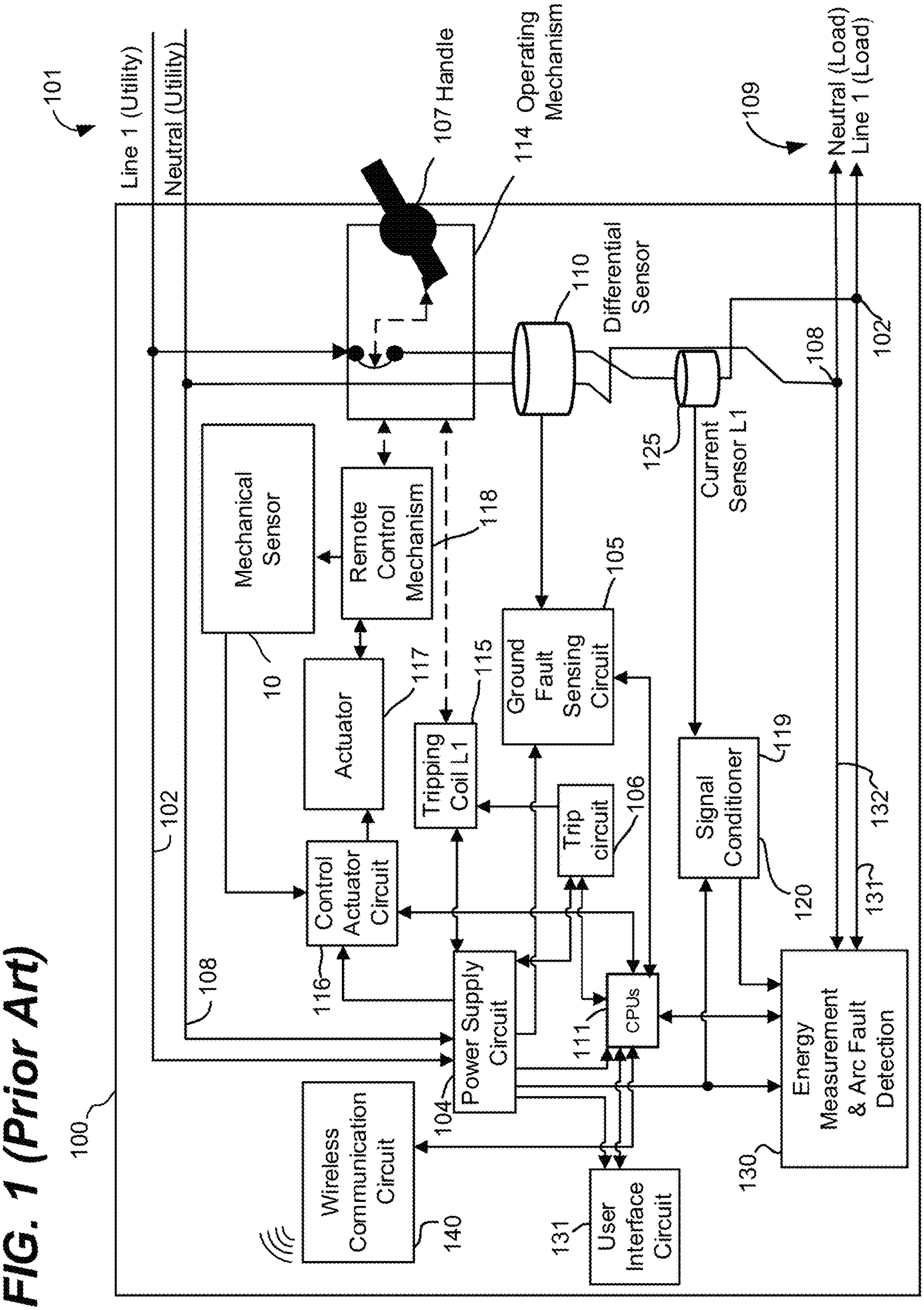
FIG. 1 (Prior Art)
FIG. 1 is a schematic block diagram of an electrical protective device with a mechanical sensor of the prior art.
Figure 2:
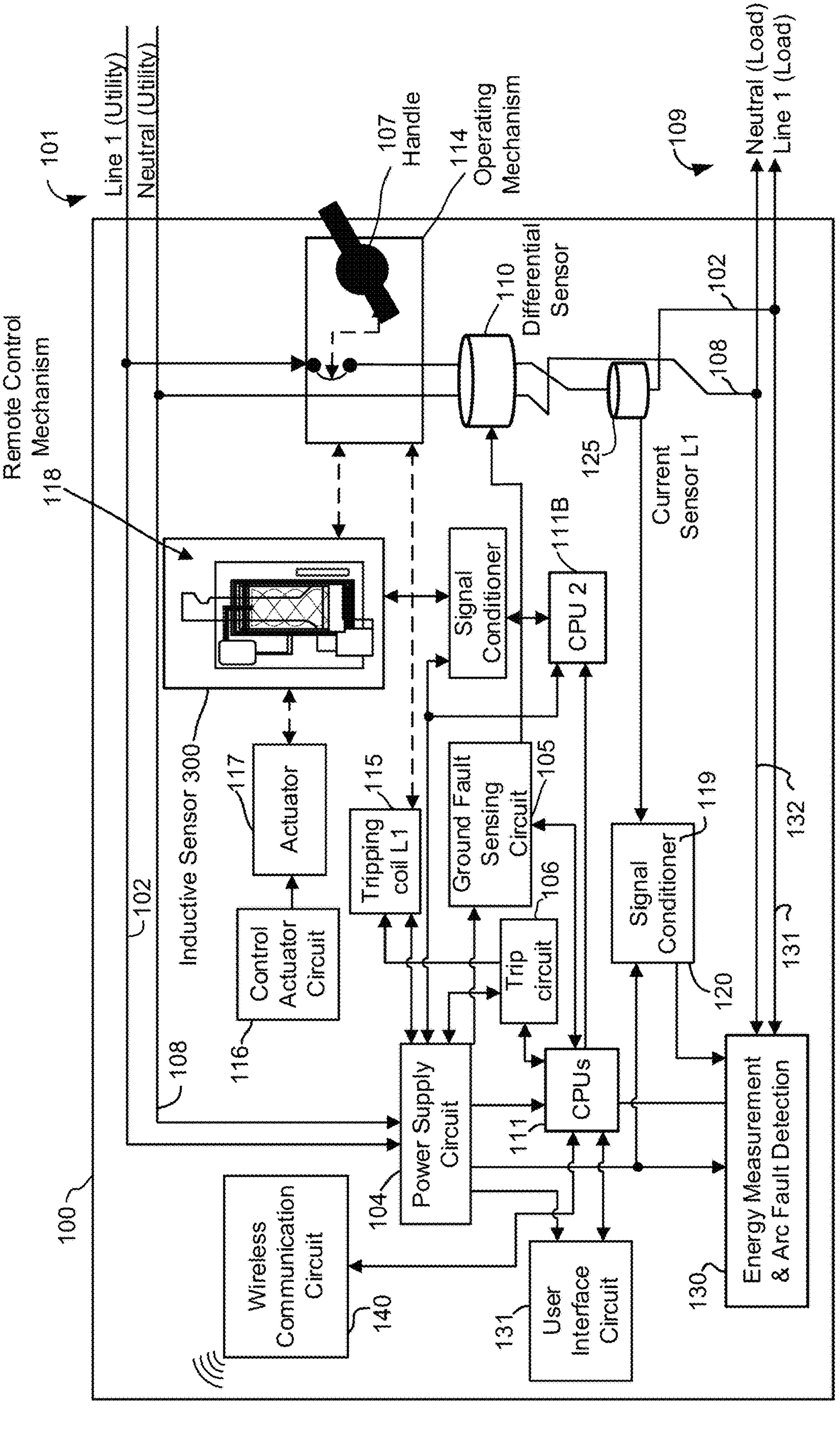
FIG. 2 is a schematic block diagram of an electrical protective device comprising an inductive sensor, according to an embodiment.
Figure 3:
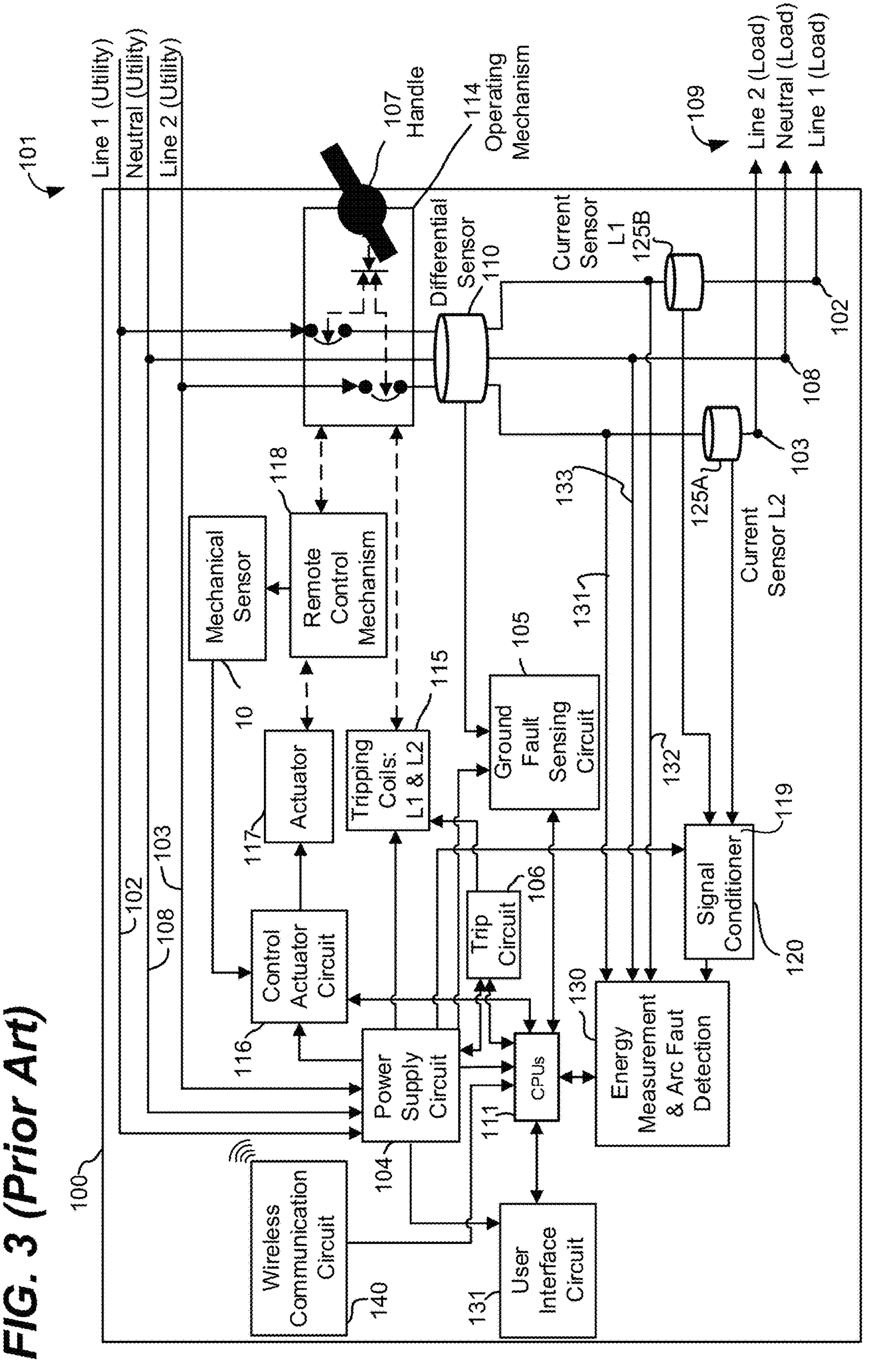
FIG. 3 (Prior Art)
FIG. 3 is a schematic block diagram of an electrical protective device with a mechanical sensor of the prior art.
Figure 4:
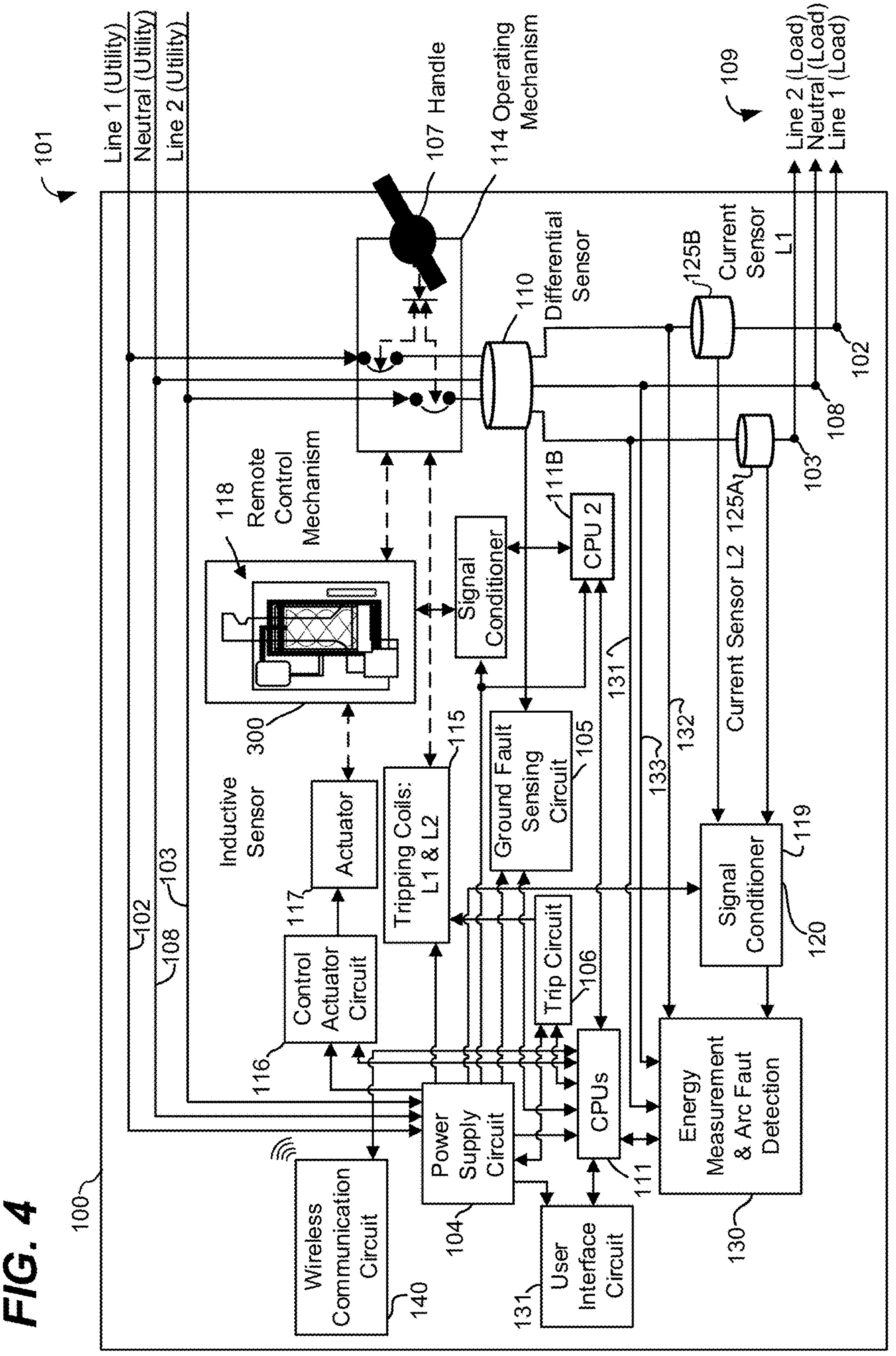
FIG. 4 is a schematic block diagram of an electrical protective device comprising the inductive sensor, according to an embodiment.
Figure 5:
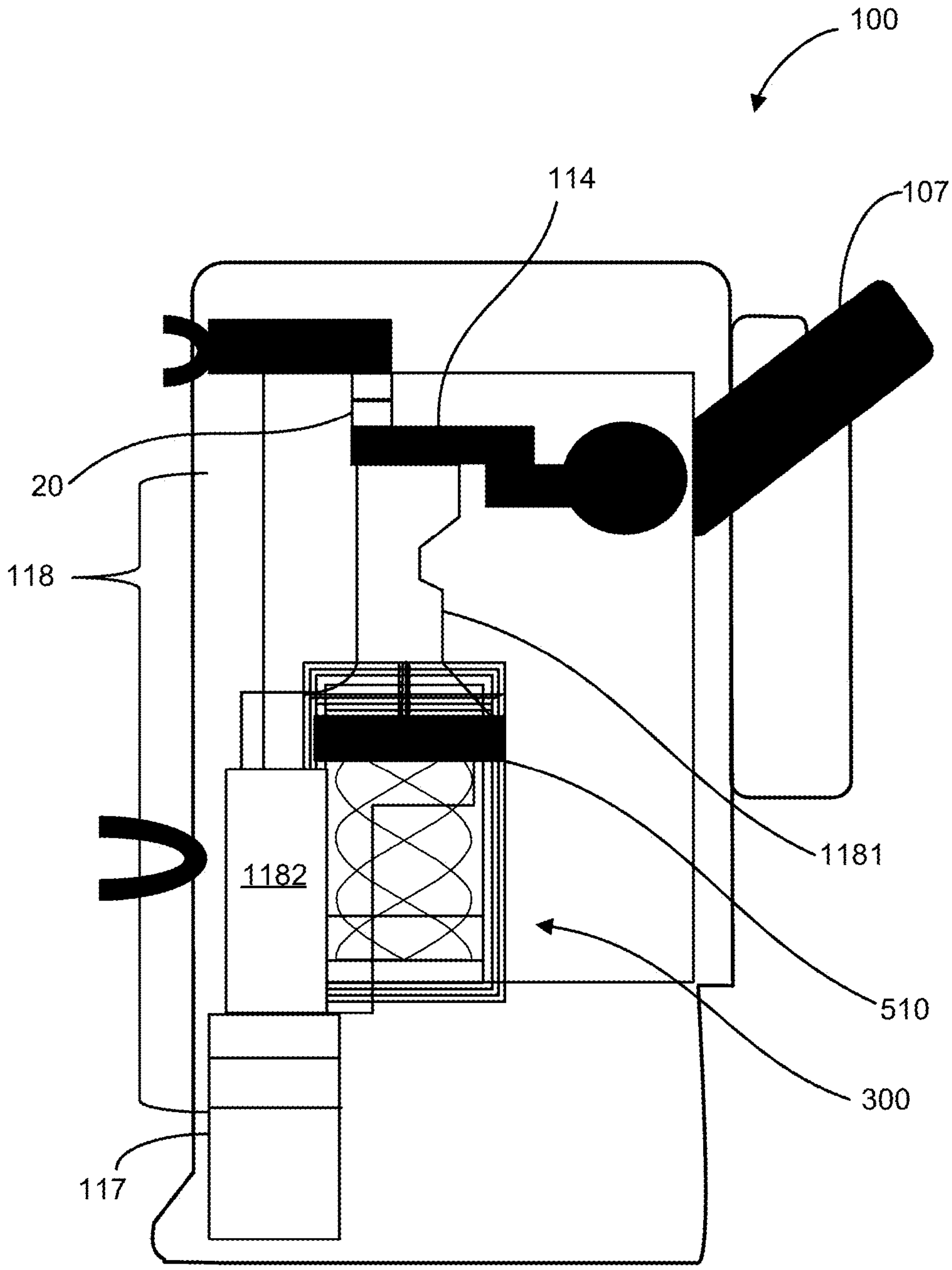
FIG. 5 is an illustration of an electrical protective device with an inductive sensor, according to an embodiment.
Figure 6:
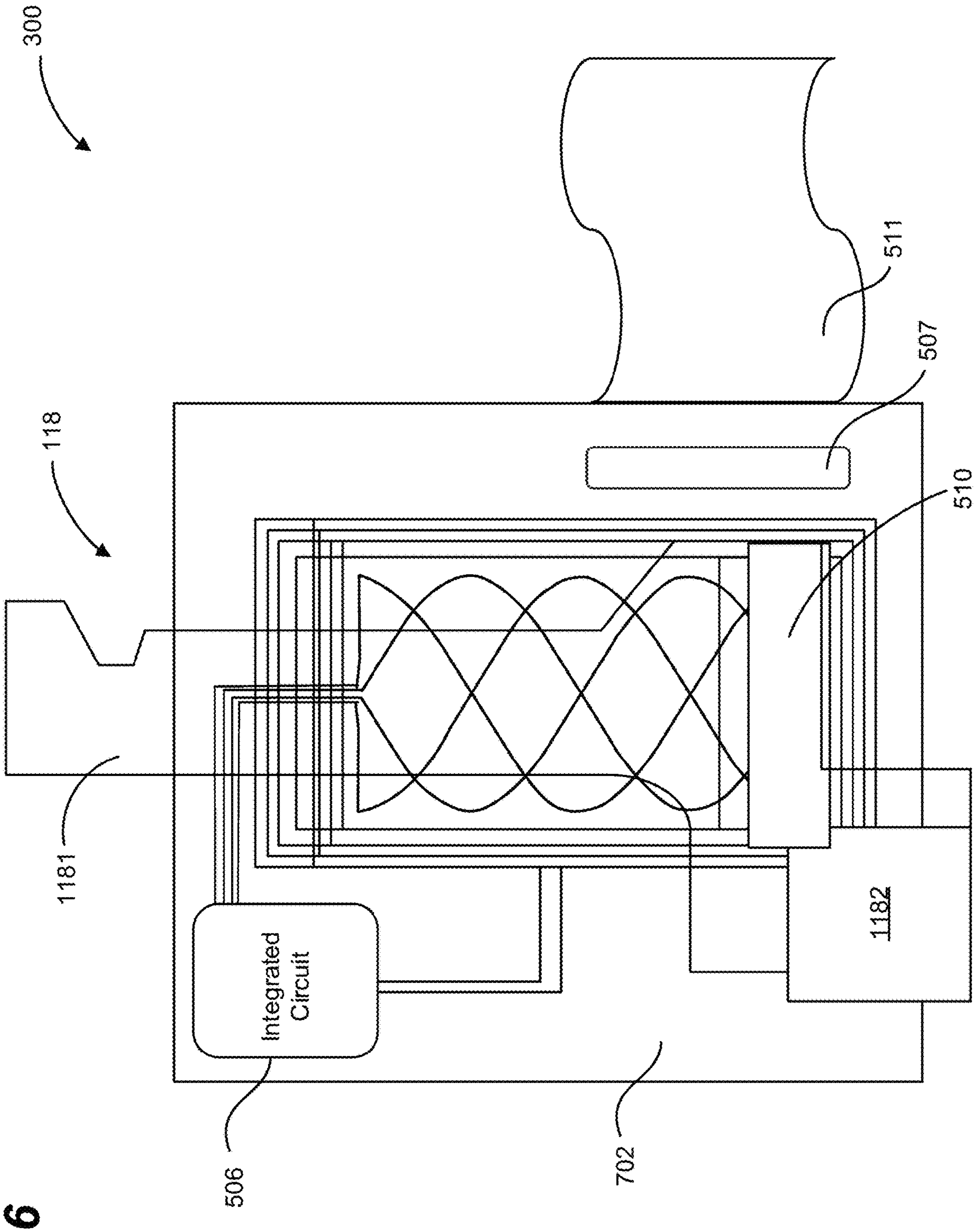
FIG. 6 is a schematic illustration of the inductive sensor of FIG. 5, according to an embodiment.
Figure 7:
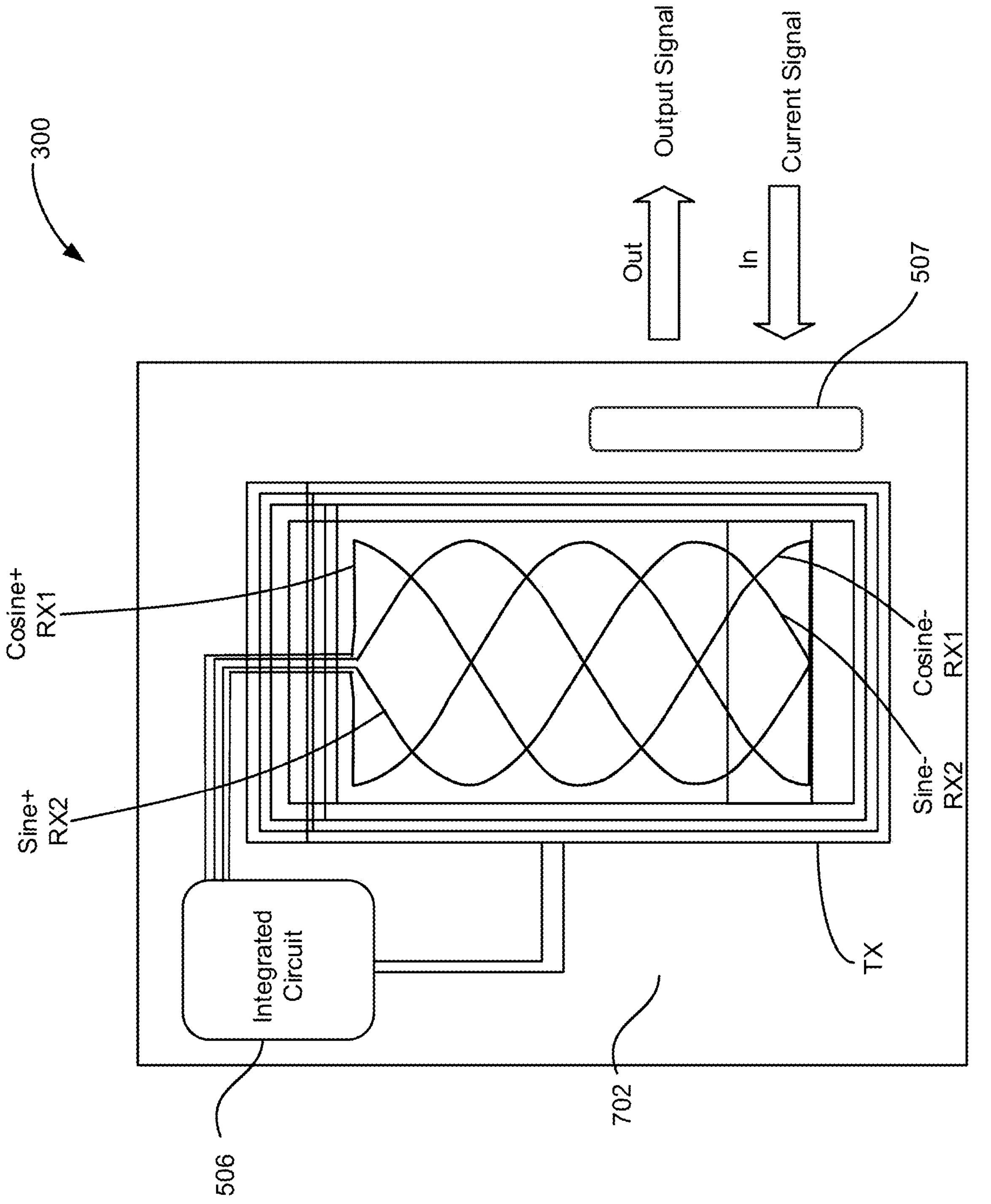
FIG. 7 is another schematic illustration of the inductive sensor of FIG. 5, according to an embodiment.

Referring now to FIGS. 1-4, an example of an industrial automation device and more particularly to an electrical protective device is generally indicated at reference number 100. Broadly, electrical protective devices 100 comprise smart current flow devices configured for protecting industrial processes and components thereof from excessive current conditions. Exemplary smart current flow devices include residential and industrial circuit breakers, electrical protective receptacles, and safety switches. In one embodiment, the electrical protective device 100 comprises a miniature circuit breaker (MCB). For example, FIGS. 1 and 2 show a smart 1 pole dual function MCB, whereas FIGS. 3 and 4 show a smart 2 pole dual function MCB. To this end, the electrical protective device 100 includes a number of functional components or modules, some of which are represented here as blocks. It will be understood, of course, that each block shown here (and in subsequent figures) may be divided into several constituent blocks, or two or more blocks may be combined into a single block, within the scope of the present disclosure.

As can be seen, the electrical protective device 100 has a utility power line and a utility neutral line connected to a line side 101 of the electrical protective device 100. Current from the utility power line is carried over a main conductor 102 to various loads connected to a load side 109 of the electrical protective device 100. A neutral conductor 108 connects the load neutrals to the utility neutral line. The electrical protective device 100 in this example includes a ground fault sensing circuit 105 connected to a ground fault sensor 110. The main conductor 102 passes through the ground fault sensor 110 and also through a current sensor 125. An integrator or other signal processing front end 119, which may include a signal conditioner 120, receives the signals from the current sensor 125 and provides the signals to an energy measurement and arc fault detection circuit 130. Power for the energy measurement circuit 130, CPU 111, and other components in the breaker 100 is provided by a power supply circuit 104, as shown.

An example of general operation of the electrical protective device 100 will now be described. In general, the CPU 111, which may be a microcontroller, monitors current measurements obtained from the ground fault sensor 110 to detect occurrence of a fault condition in a known manner. Upon detection of a fault condition, the CPU 111 outputs a trip signal to a trip circuit 106 that actuates a tripping coil 115, which in turn opens a trip mechanism 114 (e.g., switch, relay) to interrupt current flow through the breaker 100. A reset mechanism allows a user to later set/reset the trip mechanism 114 after a trip event. Energy and power usage is measured by the energy measurement circuit 130 using line voltage 132, neutral voltage 131, and current signal supplied by a signal processing front end 119. A wireless communication circuit 140 may be used to transmit trip data, current measurements, energy measurements, linear motion data, and other information to an external monitoring system, such as a power usage monitoring system, for analysis.

FIGS. 1 and 3 provide examples of electrical protective devices 100 using current mechanical sensors 10. One difficulty recognized with current mechanical sensors 10, is that they are limited in the information they provide. In one example, the mechanical sensor 10 comprises a mechanical switch that only provides a discrete output regarding whether the switch is on or off. FIGS. 2 and 4 depict electrical protective devices 100 using the inductive sensor 300 of the present disclosure. As will be explained in greater detail below, the present disclosure overcomes the shortcomings of current mechanical sensors 10 by providing an inductive sensor 300 that is configured to contactlessly measure linear motion of a component of the electrical protective device.

FIGS. 2, 4, and 5-8 provide exemplary embodiments of the electrical protective device 100 comprising the inductive sensor 300. Broadly, the electrical protective device 100 comprises a printed circuit board assembly PCBA comprising at least one sensor portion 702 and a target portion 704, an electrically conductive target 510 mounted on the target portion 704 of the PCBA, and the inductive sensor 300 mounted on the sensor portion 702 of the PCBA. In an embodiment, portions 702, 704 comprise layers of the PCBA. The inductive sensor 300 is configured to measure real-time linear motion of moving components of the electrical protective device 100. For example, in the illustrated embodiment of FIG. 5, an electrically conductive target 510 is operably connected to a remote control mechanism 118 of the electrical protective device, and as will be explained in greater detail below, the inductive sensor 300 is configured to contactlessly measure linear motion of the electrically conductive target 510 which corresponds to the linear motion of the remote control mechanism.

Individual components of the electrical protective device 100 and exemplary embodiments of the inductive sensor 300 will now be described before turning to exemplary methods of measuring linear motion of moving components of an electrical protective device 100.

The remote control mechanism 118 is mounted on the PCBA on the target portion 704. Broadly, the remote control mechanism 118 comprises a slider 1181 and a spring 1182. In one embodiment, the remote control mechanism 118 interacts with other components of the electrical protective device 100 (e.g., the energy measurement and arc fault detection circuit 130) to determine whether to open or close the MCB. The remote control mechanism 118 is configured to move the slider 1181 (e.g., by compression or rarefaction of the spring 1182) based at least on the interaction with other components of the electrical protective device. For example, the operating mechanism 114 mechanically couples the slider 1181 of the remote control mechanism to electrical blade contacts 20 of the MCB, such that motion of the slider causes movement of the electrical blade contacts. In one embodiment, an indicator 107 is operably coupled to the remote control mechanism to indicate a state of the MCB. The indicator 107 comprises at least one of a non-interactive indicator such as a flag or light and an interactive indicator such as a handle. The interactive indicator is configured to be actuated to control the state of the MCB.

Figure 8:
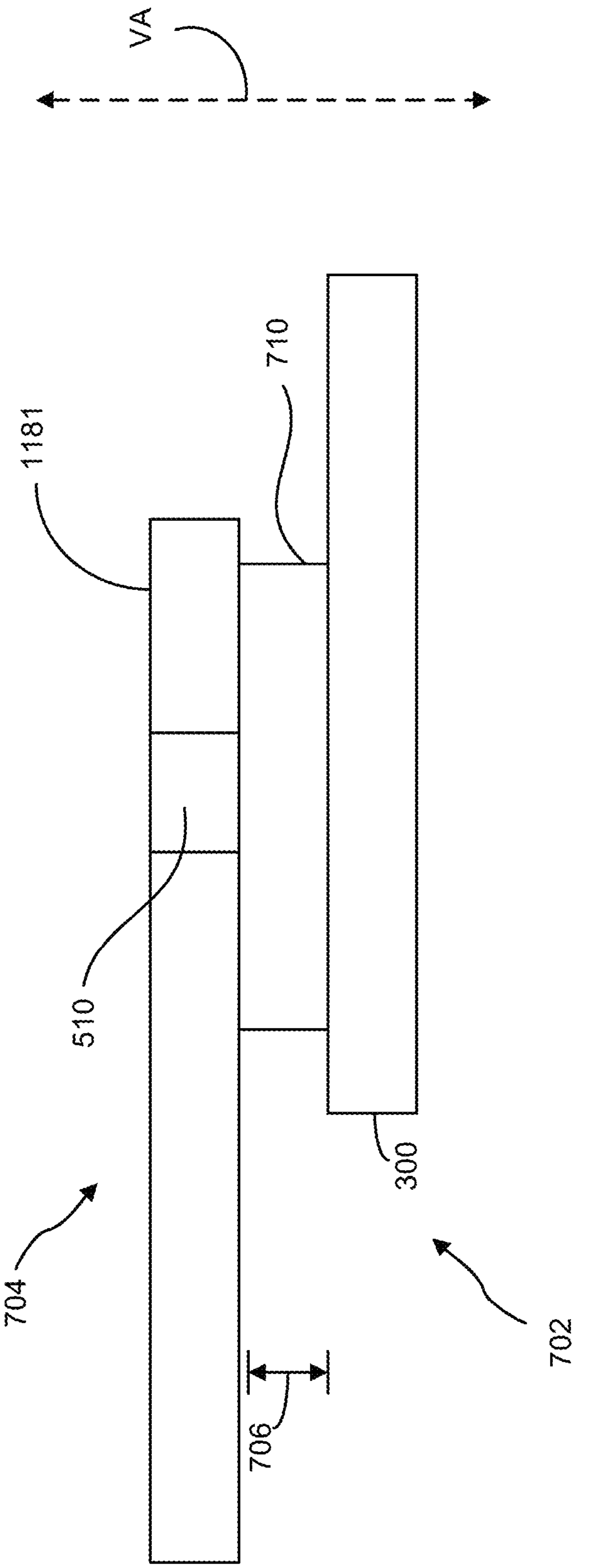
FIG. 8 is a side view of the inductive sensor shown in FIGS. 5-7, according to an embodiment.

In one embodiment, the electrically conductive target 510 (e.g., a metal target) is integrally formed as a moving component (e.g., the slider 1181) of the electrical protective device 100. In another embodiment, the electrically conductive target 510 is operably coupled to the moving component (e.g., the slider 1181) such that the electrically conductive target is configured to replicate the linear motion of the moving component. In the illustrated embodiment, the electrically conductive target 510 is operably coupled to the slider 1181 of the remote control mechanism 118 to replicate linear motion of the slider. As shown in FIG. 8, the electrically conductive target 510 is spaced apart from the inductive sensor 300 along a vertical axis VA of the PCBA at a predetermined spacing gap 706. Moreover, in in the illustrated embodiment, the electrically conductive target 510 is spaced apart from the inductive sensor 300 with a spacer 710, however it will be apparent to one of ordinary skill in the art that the electrically conductive target may be spaced apart from the inductive sensor without using a spacer. The spacer 710 is formed of non-conductive material such as plastic or ceramic.

Figure 9A:
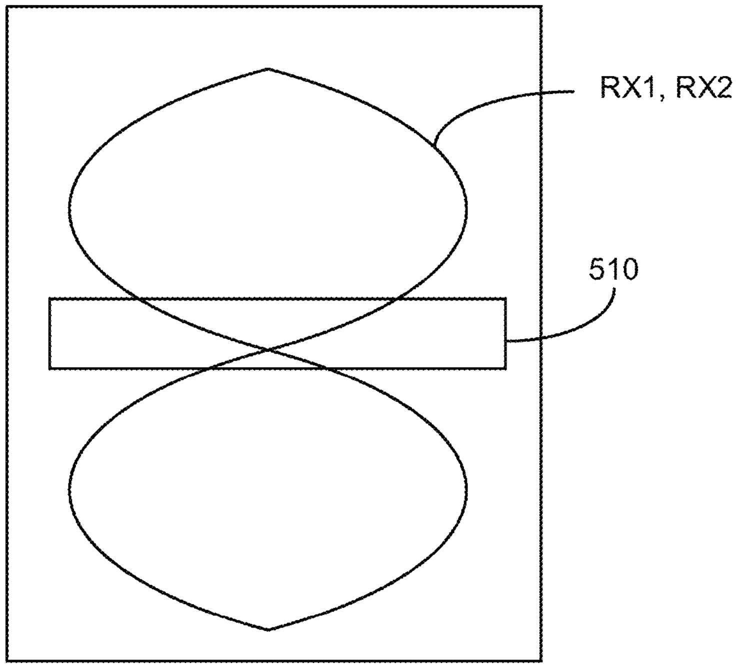
FIG. 9A is a schematic illustration of sinusoidal-shaped receiver coils of the inductive sensor, according to an embodiment.
Figure 9B:
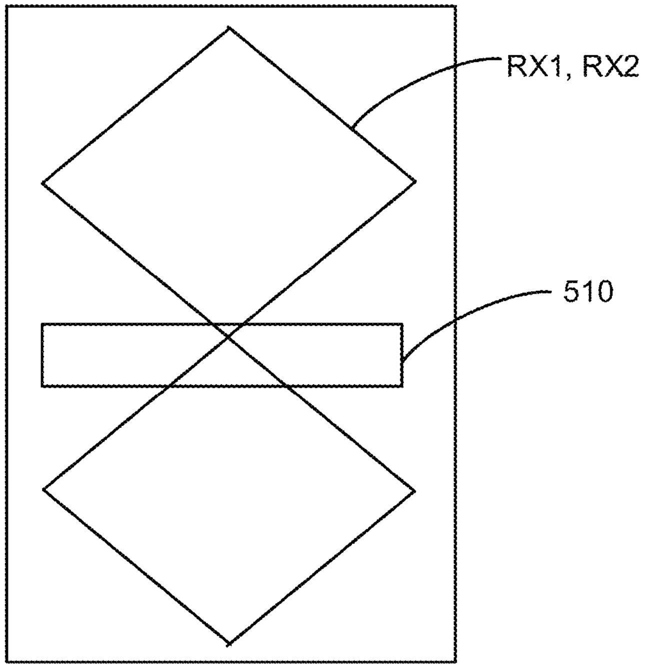
FIG. 9B is a schematic illustration of diamond-shaped receiver coils of the inductive sensor, according to an embodiment.

The inductive sensor 300 comprises a transmitter coil TX and a plurality of receiver coils RX1, RX2. In the illustrated embodiment, the transmitter coil TX comprises a rectangular-shaped planar coil with the receiver coils RX1, RX2 therebetween. The transmitter coil TX and receiver coils RX1, RX2 are typically designed as traces on the sensor portion 702 of the PCBA. For example, the transmitter coil TX comprises a conductive trace integrated on the sensor portion 702 of the PCBA, and each of the receiver coils RX1, RX2 also comprise a conductive trace integrated onto the sensor portion of the PCBA. FIG. 9A shows a sinusoidal trace configuration of the receiver coils RX1, RX2, whereas FIG. 9B shows a diamond trace configuration of the receiver coils. From a manufacturing perspective, the diamond-shaped coils are easier to implement and save manufacturing costs. However, the sinusoidal-shaped coils can reduce electromagnetic interference and crosstalk in high-frequency circuits, thus improving electromagnetic compatibility. Moreover, for high-speed signals lines and specific protocol signal lines, sinusoidal-shaped coils can reduce signal waveform distortion and delay distortion, thereby enhancing signal integrity. Sinusoidal-shaped coils can also avoid the "sharp corners" introduced by right-angle traces, thus reducing the complexity of the PCB layout and the volume and weight of the circuit board.

In one example, the receiver coils RX1, RX2 comprise first and second receiver coils physically shifted 90° on the PCBA with respect to one another, thereby defining a 90° phase shift between the first and second receiver coils, such that one or more output signals of the first and second receiver coils also comprise a 90° phase shift in relation to the linear displacement of the electrically conductive target 510, as will be explained in greater detail below. The 90° phase shift in the output signals enables the generation of ratiometric sine and cosine signals (e.g., Sine−RX2, Cosine−RX1, Sine+RX2, Cosine+RX2) that may be converted into an absolute position to indicate positon of the electrically conductive target 510.

The transmitter coil TX is electrically connected to an integrated circuit 506 of the PCBA such that the transmitter coil is configured to receive a high frequency time varying signal from the integrated circuit. Accordingly, the transmitter coil TX is configured to produce a magnetic field when energized by the integrated circuit 506. The receiver coils RX1, RX2 are each electrically coupled to the transmitter coil TX via the magnetic field produced by the transmitter coil when energized. Furthermore, the magnetic field induces one or more output signals on the receiver coils RX1, RX2. For example, the magnetic field induces voltages on the receiver coils RX1, RX2. Without the electrically conductive target 510, the voltages are compensated to achieve zero outputs, due to the balanced anti-serial connection of their segments. With the electrically conductive target 510, the magnetic field induces eddy currents in the electrically conductive target thereby generating a counter magnetic field. The counter magnetic field alters the output signals of the receiver coils RX1, RX2. For example, the counter magnetic field reduces the voltages induced in the receiver coils RX1, RX2, thereby creating an imbalance in the anti-serial coil segment voltages. Accordingly, the counter magnetic field alters features of the voltages such as amplitude and polarity with the position of the electrically conductive target 510.

In the illustrated embodiment, the integrated circuit 506 is integrated on the sensor portion 702 of the PCBA. It is envisioned that the sensor portion 702, target portion 704, and components thereof may be connected to other components of the electrical protective device 100 via a connector 511 such as a flexible connector, flexible wire jumper, block terminals, etc. Particularly, in the illustrated embodiment, the sensor portion 702 comprises input and output ports 507 configured for connecting the components on the sensor portion to other components of the electrical protective device 100. For example, the integrated circuit 506 is configured to receive as input, power from the power supply circuit 104 to transmit a high frequency time varying signal to the transmitter coil TX for energizing the transmitter coil to produce the magnetic field on the sensor portion 702. Moreover, the integrated circuit 506 is configured to receive the one or more output signals induced by the magnetic field, and transmit the output signals (e.g., to other components of the electrical protective device 100 such as an industrial automation device processor) for external signal processing.

In an exemplary embodiment, the integrated circuit 506 is further configured to at least one of amplify and filter the output signals before outputting the output signals for external signal processing. For example, the integrated circuit 506 is configured to perform a synchronous demodulation of the received signals, and then filter and output the signals for external signal processing.

In an exemplary embodiment, the industrial automation device processor of the electrical protective device 100 comprises either a microprocessor (MPU) or microcontroller (MCU). In either case the industrial automation device processor is configured to receive the output signals and transform the output signals into information that can characterize instantaneous position, velocity, acceleration and other metrics of the electrically conductive target 510 coupled to the remote control mechanism 118. In one example, the industrial automation device processor comprises embedded firmware comprising an initialization component and a run-time component. The initialization component configures hardware peripherals on the MPU/MCU, whereas the run-time component actively receives the output signals and transforms them into usable information.

Figure 10:
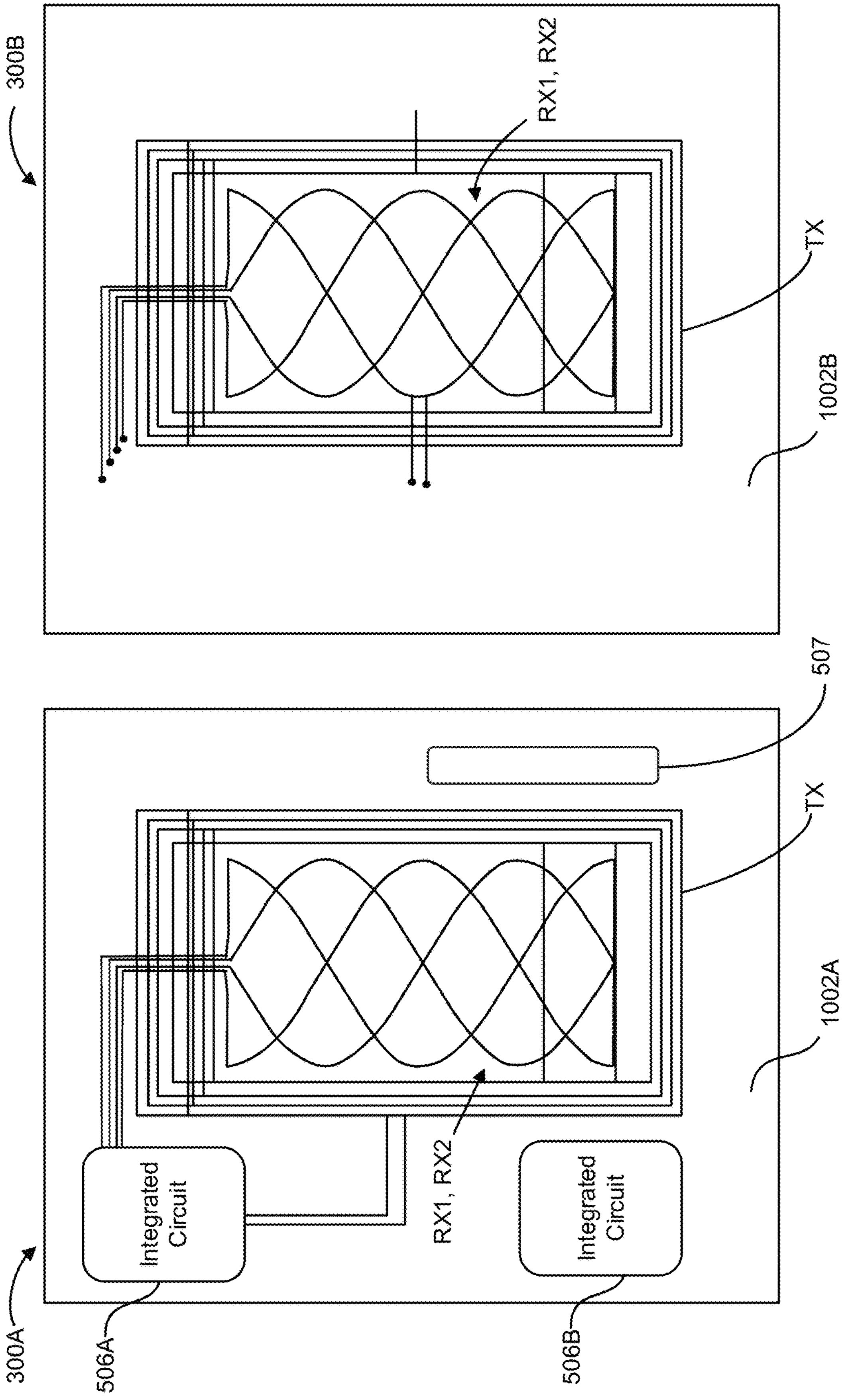
FIG. 10 is a schematic illustration of a redundant inductive sensor system comprising two inductive sensors, according to an embodiment.

Referring now to FIG. 10 a redundant inductive sensor system is generally indicated at reference number 1000. Similar to above, the redundant inductive sensor system 1000 is configured for measuring linear motion of the electrically conductive target 510. However, this embodiment comprises a plurality of inductive sensors 300A, 300B. In one example, the inductive sensors 300A, 300B each use a distinct operation frequency to capture the same range of linear motion of the electrically conductive target 510. Generally, the plurality of inductive sensors 300A, 300B operate at different frequencies to provide redundancy in the case of failure of one of the sensors. Moreover, the inductive sensors 300A, 300B are configured to operate at different frequencies to avoid undesired interaction between the sensors. For example, the redundant inductive sensor system 1000 configures the electrically protective device 100 with multiple inductive sensors 300A, 300B to ensure that all linear motion of the electrically conductive target 510 is captured.

In the illustrated embodiment, the redundant inductive sensor system 1000 comprises the plurality of inductive sensors 300A, 300B each configured to detect a unique range of linear displacement of the electrically conductive target 510. Moreover, the PCBA comprises multiple portions. For example, the PCBA comprises a plurality of sensor portions 1002A, 1002B. Moreover, each of the sensor portions 1002A, 1002B are spaced apart from the electrically conductive target 510 along the vertical axis of the PCBA at the predetermined spacing gap 706. Each of the inductive sensors 300A, 300B are configured on one of the plurality of sensor portions 1002A, 1002B of the PCBA.

The plurality of inductive sensors 300A, 300B each comprise a transmitter coil TX configured for producing a magnetic field when energized. Each transmitter coil TX comprises a conductive trace integrated onto the respective sensor portion 1002A, 1002B of the PCBA. Furthermore, each of the inductive sensors 300A, 300B comprises a plurality of receiver coils RX1, RX2 connected to the respective transmitter coil TX of each of the inductive sensors via the magnetic field produced by each respective transmitter coil when energized. Each of the receiver coils RX1, RX2 comprises a conductive trace (e.g., in a sinusoidal trace configuration or diamond shaped configuration) integrated into the respective sensor portion 1002A, 1002B of the PCBA. Moreover, in one embodiment, the receiver coils RX1, RX2 of the inductive sensors 300A, 300B each comprise first and second receiver coils physically shifted 90° on the PCBA with respect to one another, thereby defining a 90° phase shift between the first and second receiver coils of each of the inductive sensors such that the one or more output signals of the first and second receiver coils also comprise a 90° phase shift in relation to the linear displacement of the electrically conductive target 510.

As shown, the redundant inductive sensor system 1000 also comprises a plurality of integrated circuits 506A, 506B integrated on one or more of the sensor portions 1002A, 1002B of the PCBA. Each of the integrated circuits 506A, 506B are electrically connected to at least one of the transmitter coils TX of the inductive sensors 300A, 300B. Accordingly, the integrated circuits 506A, 506B are each configured to transmit a high frequency time varying signal for energizing each of the transmitter coils TX to produce the magnetic fields on the sensor portions 1002A, 1002B. The magnetic fields each induce one or more output signals on the respective receiver coils RX1, RX2 of each of the inductive sensors 300A, 300B. Moreover, each magnetic field induces eddy currents in the electrically conductive target 510 such that the eddy currents produce a counter magnetic field configured to alter the one or more output signals of at least one inductive sensor responsive to linear displacement of the electrically conductive target. Furthermore, the integrated circuits 506A, 506B are configured to receive the altered one or more output signals from at least one of the inductive sensors 300A, 300B, and at least one of amplify, filter, and output (e.g., to other components of the electrical protective device 100 such as the industrial automation device processor) the altered one or more output signals for external signal processing.

Figure 11:
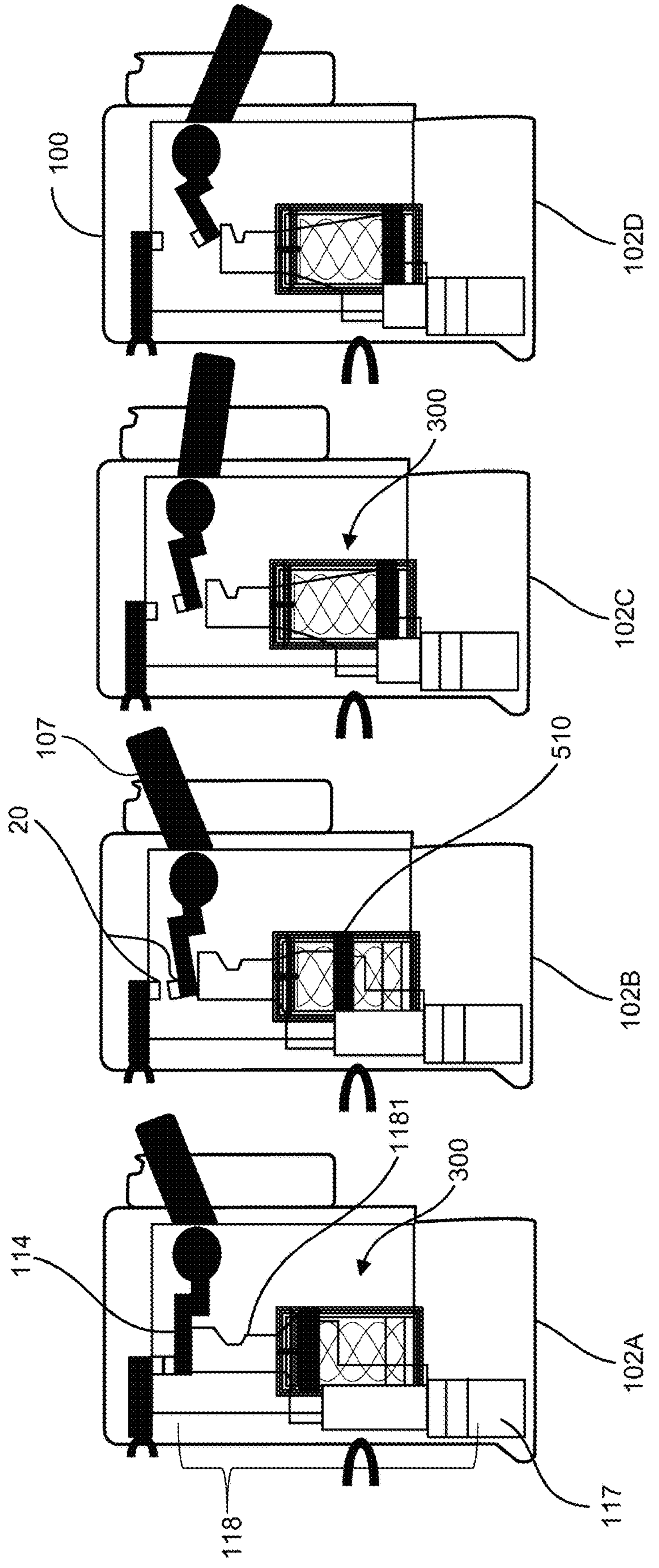
FIG. 11 is a schematic illustration of positions of a moving component of an electrical protective device comprising an inductive sensor, according to an embodiment.

Referring now to FIG. 11 an exemplary embodiment of the inductive sensor 300 integrated with the electrical protective device 100 is shown. In the illustrated embodiment, the electrical protective device 100 comprises a smart 2 pole dual function MCB. The electrical protective device 100 comprises a slider 1181 with the electrically conductive target 510 operably connected thereto to replicate movement of the slider. The inductive sensor 300 is used to measure linear motion of the slider 1181 to determine a state of the MCB. For example, the inductive sensor 300 measures linear motion of the electrically conductive target 510 corresponding to linear motion of the slider 118, which thereby corresponds to a position of electrical blade contacts 20 indicative of a state of the MCB. Still referring to FIG. 11, an on state 102A, off state 102B, and a trip state 102C of the MCB are shown. 102D represents an off state of the MCB induced by the interactive indicator 107 rather than the remote control mechanism 118.

Figure 12A:
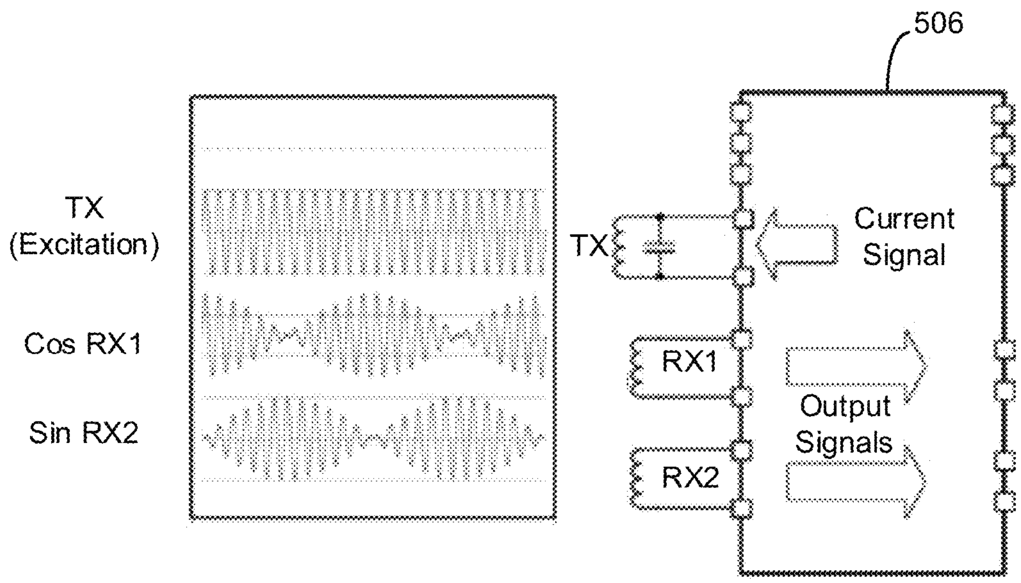
FIG. 12A is a schematic illustration of input and output signals of an integrated circuit and the inductive sensor, according to an embodiment.

An example of signal flow of the present disclosure will now be described. Initially, the integrated circuit 506 drives a high frequency time varying signal into the transmitter coil TX, and generates a magnetic field at a particular frequency. The magnetic field induces voltages in the receiver coils RX1, RX2, thus generating eddy currents (Foucault's currents). Without the electrically conductive target 510, due to the balanced, anti-serial connection of their segments (Cosine+RX1 and Cosine-RX1, Sine+RX1 and Sine-RX2), the voltages are compensated to achieve zero output at each pair of terminals of the receiver coils. If the electrically conductive target 510 is placed above the receiver coils RX1, RX2 the magnetic field induces eddy currents on the surfaces of the electrically conductive target. The eddy currents generate a counter magnetic field thus reducing a total flux density underneath. The voltage induced in the receiver coil RX1, RX2 areas underneath the electrically conductive target 510 is reduced, thus creating an imbalance in the anti-serial coil segment voltages. An output voltage occurs on the terminals, changing amplitude and polarity with the target position. The integrated circuit 506 performs a synchronous demodulation of the received signals, and then filters and outputs them for external signal processing, as illustrated in FIG. 12A.

Figure 12B:
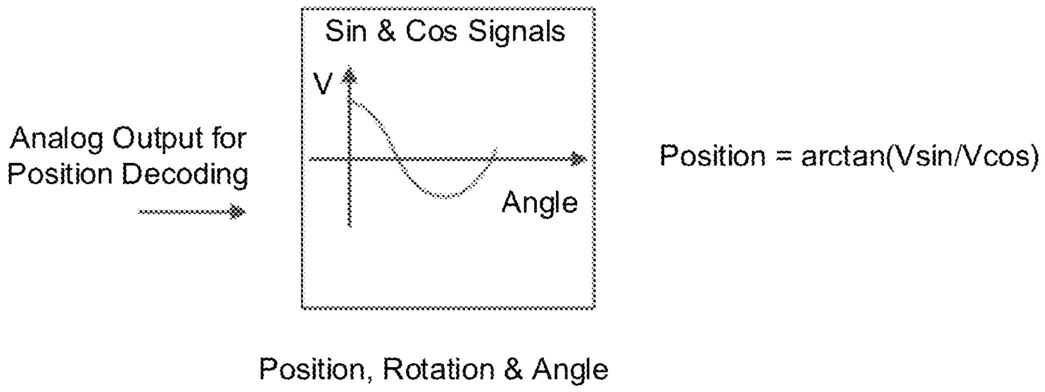
FIG. 12B is a schematic illustration of decoding the output signals shown in FIG. 12A, according to an embodiment.

Due to the 90° phase shift of the two receiver coils RX1, RX2, the output signals also have a 90° phase shift in relation to the target position, generating ratiometric sine and cosine signals. The signals can be converted into an absolute position, for example by applying a mathematical sequence such as an arctangent operation or a 2-argument arctangent of the V sin and V cos as shown in FIG. 12B:

1. $\text{Position} = (V\sin/V\cos)$

FIG. 11 is a schematic illustration of a smart current flow monitoring device comprising an inductive sensor 300 showing linear motion. This example shows the inductive sensor 300 that comprises one transmitter coil TX and two receiver coils RX1, RX2 in a sinusoidal trace configuration:

For this example, the next equations explain how the concept for the inductive sensor 300 works:

2. $\text{Cosine Loop } 1 = \text{Cosine} + RX1$

3. $\text{Cosine Loop } 2 = \text{Cosine} - RX1$

4. $\text{Sine Loop } 1 = \text{Sine} + RX2$

5. $\text{Cosine Loop } 2 = \text{Sine} - RX2$

6. $\text{Sine Loop} = \text{Sine Loop } 1 + \text{Sine Loop } 2$

7. $\text{Cosine Loop} = \text{Cosine Loop } 1 + \text{Cosine Loop } 2$

Due to the alternating clockwise and counterclockwise winding direction of each segment in a loop (for example Cosine RX1=clockwise Cosine Loop1+counterclockwise Cosine Loop 2), the induced voltages in each segment have alternating opposite polarity.

8. $V\text{sine}Loop1 = V\text{sine}Loop2$

9. $V\text{cosine}Loop1 = V\text{cosine}Loop2$

If no target is present, the secondary voltages cancel each other:

10. $V\sin = V\text{sine}Loop1 + V\text{sine}Loop2 = 0\ V$

11. $V\cos = V\text{cosine}Loop1 + V\text{cosine}Loop2 = 0\ V$

With a target placed above the coils, the secondary voltage induced in the covered area is lower than the secondary voltage without a target above it:

12. $V\text{sine}Loop1 \neq -V\text{sine}Loop2$

13. $V\text{cosine}Loop1 \neq -V\text{cosine}Loop2$

This creates an imbalance of the secondary voltage segments, and thus a secondary voltage different 0 V is generated, depending on the location of the target:

14. $V\sin = V\text{sine}Loop1 + V\text{sine}Loop2 \neq 0\ V$

15. $V\cos = V\text{cosine}Loop1 + V\text{cosine}Loop2 \neq 0\ V$

A method for measuring linear motion of the electrically conductive target 510 mounted on the PCBA for the electrical protective device 100 will now be described.

Referring to FIG. 12A, the integrated circuit 506 transmits the high frequency time varying signal to the transmitter TX such that the transmitter TX is excited and energized, thereby producing a magnetic field. The magnetic field then induces one or more output signals (e.g., Cos RX1, Sin RX2) on the receiver coils RX1, RX2 on the sensor portion of the PCBA. Furthermore, the magnetic field induces eddy currents in the electrically conductive target 510. Accordingly, the eddy currents produce a counter magnetic field that alters the one or more output signals of the receiver coils RX1, RX2 responsive to a linear displacement of the electrically conductive target 510. The integrated circuit 506 then receives the altered one or more output signals and at least one of amplifies and filters the altered one or more output signals before outputting the one or more output signals for external processing. For example, the integrated circuit 506 performs a synchronous demodulation of the received signals, and then filters and outputs the signals for external processing. In an exemplary embodiment, external processing comprises converting the altered one or more output signals into digital data for characterizing at least one of position, velocity, and acceleration of the electrically conductive target 510. For example, external processing includes applying a 90° phase shift to the altered one or more output signals to generate one or more ratiometric sine and cosine signals. A mathematical sequence is applied to the ratiometric sine and cosine signals, such as the arctangent operation shown in FIG. 12B, to convert the altered output signals into an absolute position.

Having described the invention in detail, it will be apparent that modifications and variations are possible without departing from the scope of the invention defined in the appended claims.

Embodiments of the present disclosure comprise a special purpose computer including a variety of computer hardware, as described in greater detail herein and are operational with other special purpose computing system environments or configurations even if described in connection with an example computing system environment. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices. For purposes of illustration, programs and other executable program components may be shown as discrete blocks. It is recognized, however, that such programs and components reside at various times in different storage components of a computing device, and are executed by a data processor(s) of the device.

In operation, processors, computers, and/or servers may execute the processor-executable instructions (e.g., software, firmware, and/or hardware) such as those illustrated herein to implement aspects of the invention. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the present disclosure.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

When introducing elements of the present invention or the preferred embodiments(s) thereof, the articles “a”, “an”, “the” and “said” are intended to mean that there are one or more of the elements. The terms “comprising”, “including” and “having” are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. An inductive sensor configured for measuring linear motion of an electrically conductive target mounted on a printed circuit board assembly (PCBA) for an electrical protective device, the inductive sensor comprising:

a transmitter coil on a sensor portion of the PCBA, the transmitter coil configured for producing a magnetic field when energized;

a plurality of receiver coils on the sensor portion of the PCBA, the receiver coils each electrically coupled to the transmitter coil via the magnetic field produced by the transmitter coil when energized; and an integrated circuit on the PCBA electrically connected to the transmitter coil, the integrated circuit configured to transmit a high frequency time varying signal for energizing the transmitter coil to produce the magnetic field on the sensor portion, the magnetic field inducing one or more output signals on each of the receiver coils;

wherein the magnetic field induces eddy currents in the electrically conductive target, the eddy currents producing a counter magnetic field configured to alter the one or more output signals of the receiver coils responsive to linear displacement of the electrically conductive target;

wherein the electrically conductive target corresponds to an industrial automation device component that transitions between on, off, and trip states, and wherein the inductive sensor is configured to determine the state of the industrial automation device component based on the linear displacement of the electrically conductive target.

2. The inductive sensor of claim 1, wherein each of the transmitter coil and receiver coils comprise a conductive trace integrated on the sensor portion of the PCBA.

3. The inductive sensor of claim 2, wherein the receiver coils comprise first and second receiver coils physically shifted 90° on the PCBA with respect to one another, thereby defining a 90° phase shift between the first and second receiver coils such that the one or more output signals of the first and second receiver coils also comprise a 90° phase shift in relation to the linear displacement of the electrically conductive target.

4. The inductive sensor of claim 1, wherein the electrically conductive target is spaced apart from the sensor portion along a vertical axis of the PCBA at a predetermined spacing gap.

5. The inductive sensor of claim 1, further comprising a spacer for spacing the electrically conductive target apart from the sensor portion.

6. The inductive sensor of claim 1, wherein the integrated circuit is configured to receive the altered one or more output signals from the receiver coils and at least one of amplify, filter, and output the altered one or more output signals for external signal processing.

7. The inductive sensor of claim 1, wherein the industrial automation device component comprises the electrical protective device.

8. An electrical protective device for an industrial automation system, the electrical protective device comprising:

a printed circuit board assembly (PCBA) comprising a sensor portion and a target portion spaced apart vertically along a vertical axis of the PCBA at a predetermined spacing gap;

an electrically conductive target mounted on the target portion of the PCBA; and an inductive sensor on the sensor portion of the PCBA, the inductive sensor configured to produce a magnetic field on the sensor portion, the magnetic field inducing one or more output signals of the inductive sensor;

a remote control mechanism mounted on the target portion of the PCBA, the remote control mechanism comprising a moving component configured for controlling a state of the electrical protective device, wherein the electrically conductive target is operably connected to the remote control mechanism to replicate linear motion of the moving component, such that the linear displacement of the electrically conductive target corresponds to the linear displacement of the moving component;

wherein the magnetic field induces a plurality of eddy currents in the electrically conductive target, the eddy currents producing a counter magnetic field configured to alter the one or more output signals of the inductive sensor responsive to linear displacement of the electrically conductive target.

9. The electrical protective device of claim 8, wherein the inductive sensor is configured to at least one of amplify, filter, and output the altered one or more output signals for external signal processing.

10. The electrical protective device of claim 9, further comprising an industrial automation device processor configured to communicate with the inductive sensor to receive and process the altered one or more output signals.

11. A redundant inductive sensor system configured for measuring linear motion of an electrically conductive target mounted on a printed circuit board assembly (PCBA) for an electrical protective device, the redundant inductive sensor system comprising:

a plurality of inductive sensors wherein each of the inductive sensors are on one of a plurality of sensor portions of the PCBA, the plurality of inductive sensors each comprising a transmitter coil configured for producing a magnetic field when energized, each of the inductive sensors comprising a plurality of receiver coils connected to the respective transmitter coil of each of the inductive sensors via the magnetic field produced by each respective transmitter coil when energized; and a plurality of integrated circuits on one or more of the sensor portions of the PCBA, each of the integrated circuits electrically connected to at least one of the transmitter coils of the inductive sensors, the integrated circuits configured to transmit a high frequency time varying signal for energizing each of the transmitter coils to produce the magnetic fields on the sensor portions, the magnetic fields each inducing one or more output signals on the respective receiver coils of each of the inductive sensors;

wherein each magnetic field induces eddy currents in the electrically conductive target, the eddy currents producing a counter magnetic field configured to alter the one or more output signals of at least one inductive sensor responsive to linear displacement of the electrically conductive target;

wherein the electrically conductive target corresponds to an industrial automation device component that is configured to transition between on, off, and trip states, and wherein at least one of the inductive sensors is configured to determine the state of the industrial automation device component based on the linear displacement of the electrically conductive target.

12. The redundant inductive sensor system of claim 11, wherein each of the inductive sensors are configured to detect a unique range of linear displacement of the electrically conductive target.

13. The inductive sensor of claim 11, wherein each of the transmitter coil and receiver coils comprise a conductive trace integrated into the respective sensor portion of the PCBA, and wherein the receiver coils of the inductive sensors each comprise first and second receiver coils physically shifted 90° on the PCBA with respect to one another, thereby defining a 90° phase shift between the first and second receiver coils of each of the inductive sensors such that the one or more output signals of the first and second receiver coils also comprise a 90° phase shift in relation to the linear displacement of the electrically conductive target.

14. The inductive sensor of claim 11, wherein the sensor portions are each spaced apart from the target along a vertical axis of the PCBA at a predetermined spacing gap.

15. The inductive sensor of claim 11, wherein the integrated circuits are configured to receive the altered one or more output signals from at least one of the inductive sensors and at least one of amplify, filter, and output the altered one or more output signals for external signal processing.

16. A method for measuring linear motion of an electrically conductive target mounted on a printed circuit board assembly (PCBA) for an electrical protective device, the electrically conductive target operably connected to a remote control mechanism mounted on a target portion of the PCBA, the remote control mechanism comprising a moving component configured for controlling a state of the electrical protective device such that linear displacement of the electrically conductive target corresponds to linear displacement of the moving component, the method comprising:

transmitting, by an integrated circuit on the PCBA, a high frequency time varying signal for energizing a transmitter coil on a sensor portion of the PCBA such that the transmitter coil produces a magnetic field;

inducing, by the magnetic field, one or more output signals on receiver coils on the sensor portion of the PCBA;

inducing, by the magnetic field, eddy currents in the electrically conductive target;

producing, by the eddy currents, a counter magnetic field to alter the one or more output signals of the receiver coils responsive to linear displacement of the electrically conductive target; and determining, based on the linear displacement of the electrically conductive target, the state of the electrical protective device.

17. The method of claim 16, further comprising physically shifting the receiver coils 90° on the PCBA with respect to one another to apply a 90° phase shift to the altered one or more output signals to generate one or more ratiometric sine and cosine signals.

18. The method of claim 17, comprising applying a mathematical sequence to the one or more ratiometric sine and cosine signals to convert the altered output signals into an absolute position.

19. The method of claim 16, further comprising receiving at the integrated circuit the altered one or more output signals from the inductive sensor and at least one of amplifying, filtering, and outputting the altered one or more output signals for external signal processing.

20. The method of claim 19, wherein external signal processing comprises converting the altered one or more output signals into digital data for characterizing at least one of position, velocity, and acceleration of the electrically conducive target.

* * * * *